United States Patent
Lee (10) Patent No.: US 12,198,366 B2
(45) Date of Patent: Jan. 14, 2025

(54) OBJECT DISTANCE MEASUREMENT METHOD AND SYSTEM BASED ON CAMERA

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 380 days.

(21) Appl. No.: 17/590,018

(22) Filed: Feb. 1, 2022

(65) Prior Publication Data

US 2022/0245846 A1 Aug. 4, 2022

(30) Foreign Application Priority Data

Feb. 2, 2021 (KR) .................. 10-2021-0015053
Feb. 2, 2021 (KR) .................. 10-2021-0015054

(51) Int. Cl.
| G06T 7/60 | (2017.01) |
| G06T 7/11 | (2017.01) |
| G06T 7/136 | (2017.01) |
| G06T 7/215 | (2017.01) |

(52) U.S. Cl.
CPC .............. *G06T 7/60* (2013.01); *G06T 7/11* (2017.01); *G06T 7/136* (2017.01); *G06T 7/215* (2017.01); *G06T 2207/30252* (2013.01)

(58) Field of Classification Search
CPC ... G06T 7/60; G06T 7/11; G06T 7/136; G06T 7/215; G06T 2207/30252; G06T 7/579
See application file for complete search history.

(56) References Cited

U.S. PATENT DOCUMENTS

| 9,409,571 B2 | 8/2016 | Lueke et al. |
| 11,902,658 B2* | 2/2024 | Wang .................. G01B 11/026 |
| 2010/0055649 A1 | 3/2010 | Takahashi et al. |
| 2017/0140229 A1* | 5/2017 | Ogata ............... B60W 30/0956 |
| 2018/0022346 A1* | 1/2018 | Murakami ........... B60G 17/015 |
| | | 701/37 |
| 2021/0365707 A1* | 11/2021 | Mao ....................... G06V 10/25 |

FOREIGN PATENT DOCUMENTS

| JP | 2007219743 A | 8/2007 |
| JP | 4602444 B2 | 12/2010 |
| KR | 10-2015-0049529 A | 5/2015 |
| KR | 10-1706455 B1 | 2/2017 |
| KR | 10-1724868 B1 | 4/2017 |
| KR | 10-2116740 B | 5/2020 |

* cited by examiner

*Primary Examiner* — Amara Abdi
(74) *Attorney, Agent, or Firm* — NovoTechIP International PLLC (57) ABSTRACT

Provided is an object distance measurement method based on a camera. The object distance measurement method may include: receiving an image captured through a camera of a vehicle; extracting a bounding box area of an object included in the image; estimating location change information of the camera for a predetermined time period; and calculating a distance to the object on the basis of the location change information of the camera.

4 Claims, 12 Drawing Sheets

$Z = h_{cam} / \tan^{-1} \rho$

OBJECT DISTANCE MEASUREMENT METHOD AND SYSTEM BASED ON CAMERA

CROSS-REFERENCE TO RELATED APPLICATIONS

This application claims priority to and the benefit of Korean Patent Application No. 10-2021-0015054, filed on Feb. 2, 2021, and Korean Patent Application No. 10-2021-0015053, filed on Feb. 2, 2021, the disclosure of which is incorporated herein by reference in their entirety.

BACKGROUND

1. Technical Field

The present disclosure relates to an object distance measurement method and system based on a camera.

2. Discussion of Related Art

Recently, research and development are being actively conducted on an autonomous driving-related technology as well as various types of driver assistance systems. In order to apply such technologies to a motorway or urban environment, it is necessary to recognize various objects such as signs or obstacles on the road.

Figure 1A:
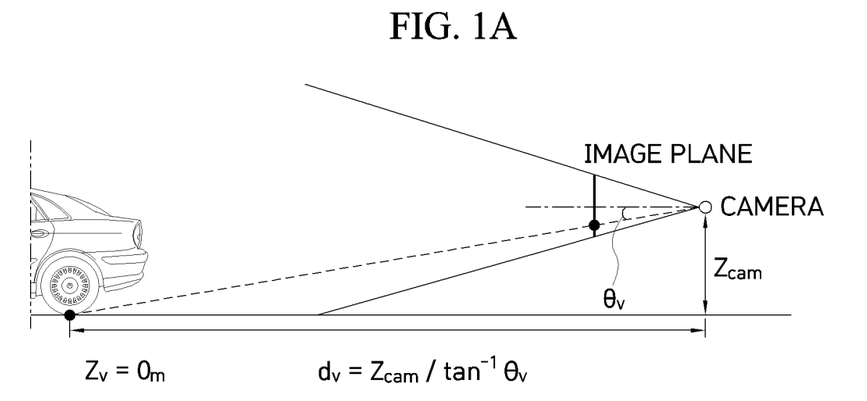
FIGS. 1A and 1B are diagrams for describing a method for calculating an object distance from a camera image according to the related art.
Figure 1B:
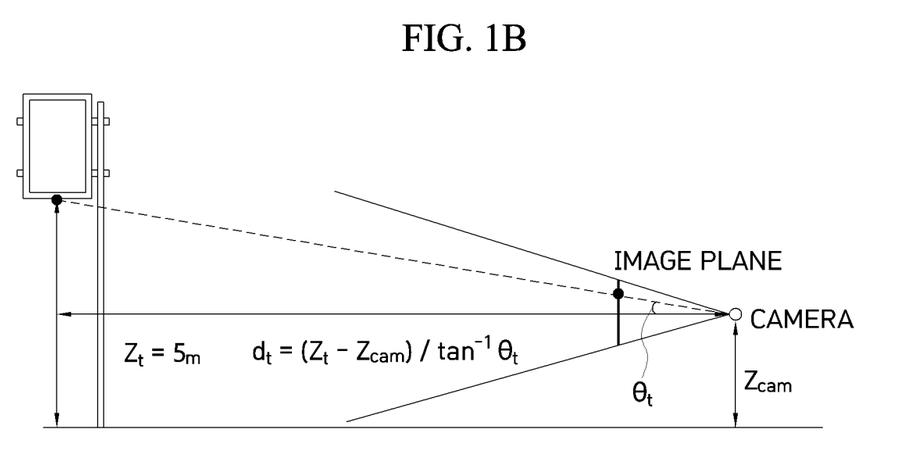

FIGS. 1A and 1B are diagrams for describing a method for calculating an object distance from a camera image according to the related art.

Since the method according to the related art provides a 2D image based on a single camera, one variable value needs to be estimated in order to provide location information of a 3D object. Since a vehicle runs on the ground, it is assumed that the position of the vehicle in a z-axis direction is 0. As the height specification of a suspension type or bridge-type sign among signs, previously known height information, e.g., 5 m, is used. Furthermore, when inner parameter information and outer parameter information of the camera are known in advance, the distance from a pixel position of an image may be calculated as illustrated in FIG. 1A or 1B.

Figure 2A:
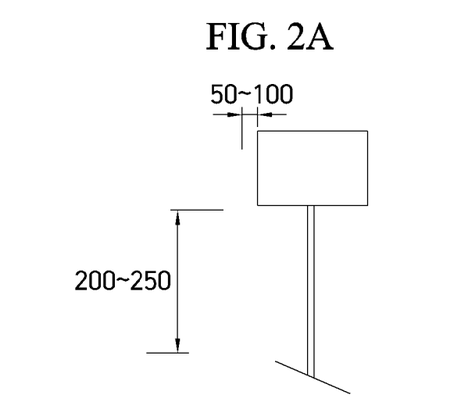
FIGS. 2A to 2C are diagrams for describing the case in which prior height information cannot be used.
Figure 2B:
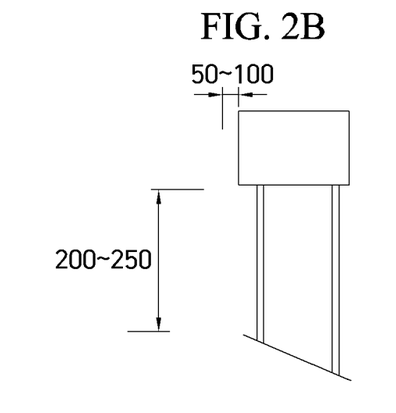
Figure 2C:
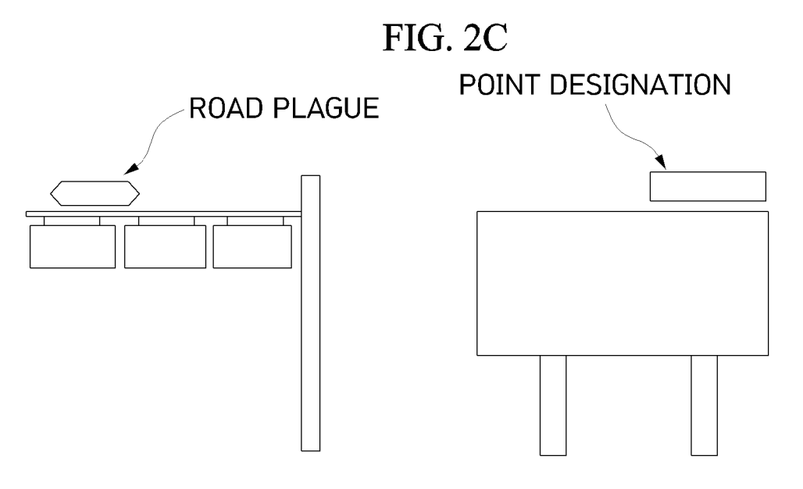

FIGS. 2A to 2C are diagrams for describing the case in which prior height information cannot be used.

For example, Korean Patent No. 10-1706455 (Road Sign Detection-Based Driving Lane Estimation Method and Apparatus) or Korean Patent Application Laid-Open No. 10-2015-0049529 (Apparatus and Method for Estimating Location of Vehicle) discloses a method for calculating a distance by using mounting height specification information of a sign.

As illustrated in FIGS. 2A to 2C, however, the height specification of a single-column or multi-column traffic sign has a range value. When a single-column traffic sign and a multi-column traffic sign are mixed and installed, the height of the traffic sign is not regulated. Thus, it is impossible to estimate a distance on the basis of the prior height information.

In addition, Korean Patent No. 10-1724868 (Apparatus and Method for Recognizing Traffic Mark Based on Image) discloses a method for estimating a distance by matching a captured image with a DB. However, the distance which can be provided by this method has low accuracy due to an information error of a GPS or the like.

Traffic lights provide information on the movements and directions of vehicles, in order to efficiently control a traffic flow, and a driver controls his/her vehicle by recognizing the state of a traffic light.

An autonomous driving controller for helping a driver's driving also requires an image-based traffic light state recognition technology, and various techniques related to the state recognition technology are suggested.

Figure 3:
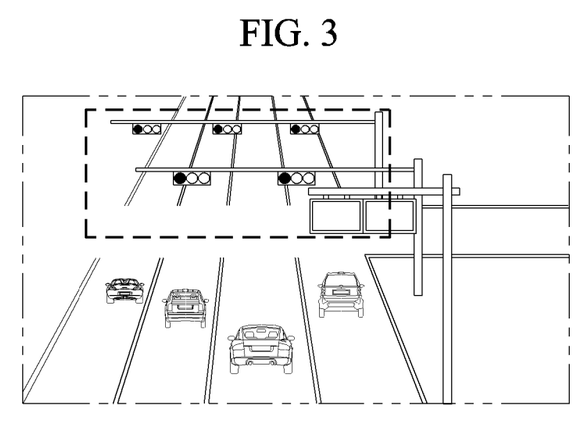
FIG. 3 is a photograph showing the situation in which there are multiple traffic lights on the road where an intersection and a crosswalk are consecutively present.

FIG. 3 is a photograph showing the situation in which there are multiple traffic lights on the road where an intersection and a crosswalk are consecutively present.

When only a single traffic light is seen from a captured forward image, a signal may be determined through recognition. However, when the intersection and the crosswalk are consecutively present as shown in FIG. 3, it is necessary to determine which signal is an intersection signal and which signal is a crosswalk signal. Furthermore, in the case of a five-way intersection, a traffic light for controlling a traffic flow of another road may be seen from the image.

In general, a driver preferentially recognizes a signal at the shortest distance ahead. Therefore, in order to control a vehicle by using traffic light information, distance information from a traffic light is needed.

SUMMARY

Various embodiments are directed to an object distance measurement method and system based on a camera, which can measure the location and distance of an object on the basis of two images captured through a camera while a vehicle moves.

Also, various embodiments are directed to an object distance measurement method and system based on a camera, which can acquire the distance between a front camera and a traffic light lens and the rotation angle of the front camera on the basis of an image captured through the front camera, select the nearest traffic light ahead on the basis of the distance and the rotation angle, and perform vehicle control according to the state information of the nearest traffic light ahead.

However, the problems to be solved by the present disclosure are not limited to the above-described problems, and other problems may be present.

In an embodiment, an object distance measurement method based on a camera may include: receiving an image captured through a camera of a vehicle; extracting a bounding box area of an object included in the image; estimating location change information of the camera for a predetermined time; and calculating a distance to the object on the basis of the location change information of the camera.

In an embodiment, an object distance measurement system based on a camera may include: a camera installed at the front of a vehicle, and configured to capture an image; a memory configured to store a program for calculating a distance to an object on the basis of the image captured by the camera; and a processor configured to execute the program stored in the memory. By executing the program, the processor may extract a bounding box area of the object included in the image, estimate location change information of the camera for a predetermined time, and then calculate the distance to the object on the basis of the location change information of the camera.

In order to solve the above-described problems, a computer program in accordance with another aspect of the present disclosure is coupled to a computer as hardware, executes the object distance measurement method based on a camera, and is stored in a computer readable recording medium.

The other details of the present disclosure are included in the detailed descriptions and the drawings.

In accordance with the embodiments of the present disclosure, the object distance measurement system and method may provide distance information when a plurality of traffic lights appears, thereby deciding priorities which are to be reflected into a driving policy.

Therefore, although a remote sign is recognized, the object distance measurement system and method may decide an operation of the vehicle in preference to a near sign, such that the vehicle can travel according to a road situation, which makes it possible to improve driving stability.

Furthermore, even before a road situation was changed but not yet reflected into a DB or map, the object distance measurement system and method may check signs according to the distance priorities thereof, and reflect the check result into a vehicle driving policy.

Furthermore, the object distance measurement system and method may measure a distance and angle of a traffic light by using a single image, and thus accurately distinguish a signal for controlling the traffic volume at the current location in a crowded intersection or five-way intersection, thereby improving the city driving performance and stability of a driving assistance system.

Furthermore, since the object distance measurement system and method can measure a distance from a single image, the measurement of the object distance measurement system and method is not affected by noise of another system, and the object distance measurement system and method may precisely determine the current location of a vehicle on the basis of the distance to a traffic light, thereby improving a localization function.

The effects of the present disclosure are not limited to the above-mentioned effects, and the other effects which are not mentioned herein will be clearly understood from the following descriptions by those skilled in the art.

DETAILED DESCRIPTION

The advantages and characteristics of the present disclosure and a method for achieving the advantages and characteristics will be clearly described through the following embodiments with reference to the accompanying drawings.

However, the present disclosure is not limited to the following embodiments, but may be implemented in various shapes different from each other, and the following embodiments are only provided to easily deliver the purposes, configurations and effects of the present disclosure to those skilled in the art to which the present disclosure pertains. Therefore, the scope of the present disclosure is defined by claims.

Terms used in this specification are used for describing exemplary embodiments while not limiting the present invention. The terms of a singular form may include plural forms unless referred to the contrary. The meaning of 'comprise' and 'comprising' used in the specification specifies a component, step, operation, and/or element but does not exclude the presence or addition of other components, steps, operations, and/or elements. Throughout the specification, like reference numerals represent the same components, and the term "and/or" includes each of mentioned components and one or more combinations thereof. Although terms "first" and "second" are used to describe various components, the components are not limited by the terms. The terms are used only to distinguish one element from another element. Therefore, a first component described below may be a second component within the technical idea of the present disclosure.

Unless defined differently, all terms (including technical and scientific terms) used in this specification may be used as meanings which are commonly understood by those skilled in the art to which the present disclosure pertains. Furthermore, terms which are defined in generally used dictionaries are not ideally or excessively construed unless clearly and specifically defined.

Figure 4:
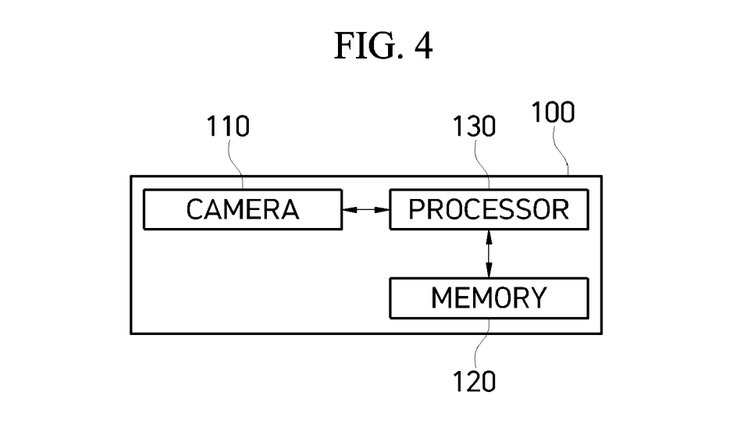
FIG. 4 is a block diagram illustrating an object distance measurement system in accordance with an embodiment of the present disclosure.

FIG. 4 is a block diagram illustrating an object distance measurement system 100 in accordance with an embodiment of the present disclosure.

The object distance measurement system 100 in accordance with the embodiment of the present disclosure includes a camera 110, a memory 120 and a processor 130.

The camera 110 is installed at the front of a vehicle and captures an image.

The memory 120 stores a program for calculating the distance to an object on the basis of the image captured by the camera 110, and the processor 130 executes the program stored in the memory 120.

By executing the program, the processor 130 extracts a bounding box area of an object included in the image, estimates a location change of the camera for a predetermined time period, and then calculates the distance to the object on the basis of information regarding the location change of the camera.

Furthermore, when the object is a lens area of a traffic light, the object distance measurement system 100 in accordance with the embodiment of the present disclosure stores, in the memory 120, a program for deciding the nearest traffic light ahead on the basis of an image captured by the camera 110.

By executing the program stored in the memory, the processor 130 extracts the lens area of the traffic light from the image, calculates the distance between the camera and the lens area, estimates a rotation angle based on the camera with respect to the lens area of the traffic light, decides the nearest traffic light ahead on the basis of the distance and the rotation angle, and then controls the vehicle on the basis of state information (e.g., traffic light information) of the nearest traffic light ahead.

Hereafter, a method performed by the object distance measurement system 100 in accordance with the embodiment of the present disclosure will be described with reference to FIGS. 5 to 11.

In the present disclosure, for convenience of understanding, the case in which an object is a sign installed on the road will be taken as an example for description. However, the present disclosure is not limited thereto. That is, the object includes various obstacles installed on the road, front-side and rear-side vehicles, pedestrians and the like.

On the road, a plurality of signs are installed to inform a driver of information or regulations for helping the driver's driving. In the case of a road where a different regulation is applied to each lane or a heading direction is different for each lane, a plurality of signs are mounted on a column. In this case, the driver gives a higher priority to a sign at a short distance rather than a sign at a long distance, and sequentially recognizes the signs and decides a driving policy, according to the priorities.

Until now, however, only the coordinate of a suspension-type or bridge-type sign having a fixed height could be estimated through the process of estimating the coordinate of a 3D sign by using 2D image information. That is, since a general sign is also mounted on a traffic light, a tunnel and the like according to a road situation, the general sign does not have a fixed height. In this case, a distance cannot be measured through the existing method.

For another example, two kinds of speed limit signs may be recognized from one image in a section where the speed limit is changed. In the case of an existing sign whose height is not decided, the distance information between the vehicle and the sign cannot be provided. Thus, a controller cannot decide the priorities of different pieces of regulation information.

Figure 5:
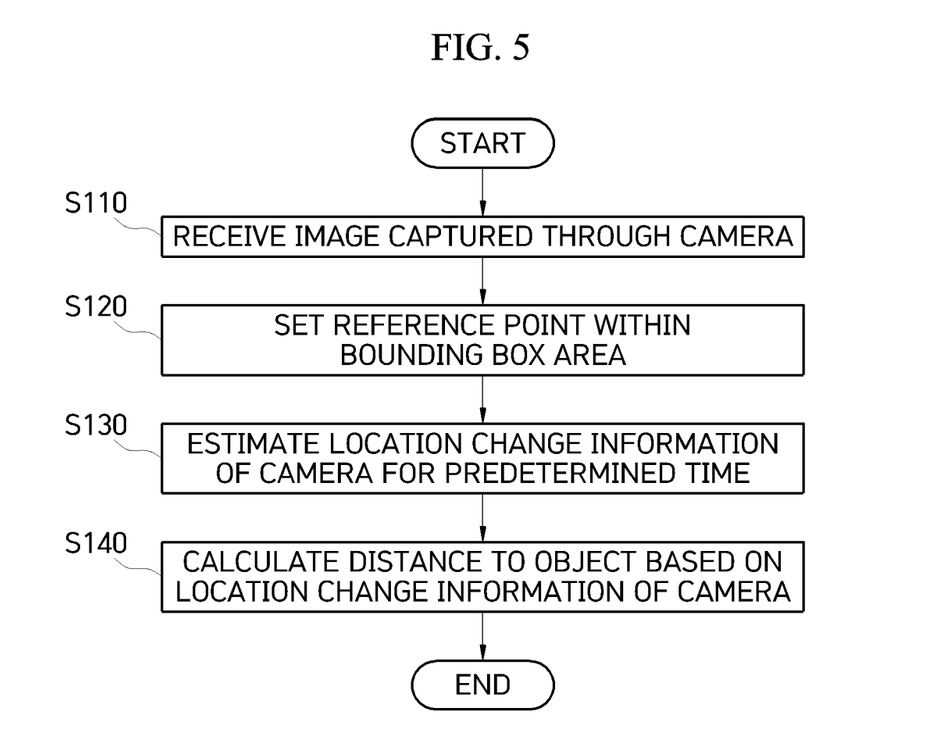
FIG. 5 is a flowchart illustrating an object distance measurement method in accordance with an embodiment of the present disclosure.

FIG. 5 is a flowchart illustrating an object distance measurement method in accordance with an embodiment of the present disclosure.

It may be understood that steps illustrated in FIG. 5 are performed by the object distance measurement system 100 based on a camera, but the present disclosure is not necessarily limited thereto. In the present disclosure, a vehicle may include not only an autonomous vehicle, but also a vehicle in which an autonomous controller can be installed and operated.

First, the system receives an image captured through a camera of the vehicle in step S110. At this time, the camera of the vehicle may be a front camera for driving assistance of the vehicle, but the present disclosure is not limited thereto.

In an embodiment, the system in accordance with the embodiment of the present disclosure receives a first image captured at a first location of the camera, and receives a second image captured at a second location of the camera after a predetermined time period has elapsed. As such, the system calculates the distance to an object on the basis of the first and second images captured at the first and second locations.

Then, the system extracts a bounding box area of the object included in the images in step S120. In an embodiment, the system in accordance with the embodiment of the present disclosure may recognize the object by using an object detection method. The object detection method may include outputting the image coordinate of the corresponding object to the bounding box area.

Based on the image coordinate, the system sets a reference point in the bounding box area.

Figure 6A:
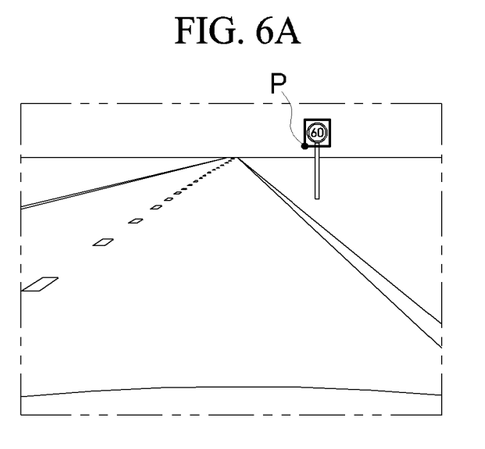
FIGS. 6A and 6B are diagrams illustrating the example in which a bounding box area and a reference point are set in first and second images.
Figure 6B:
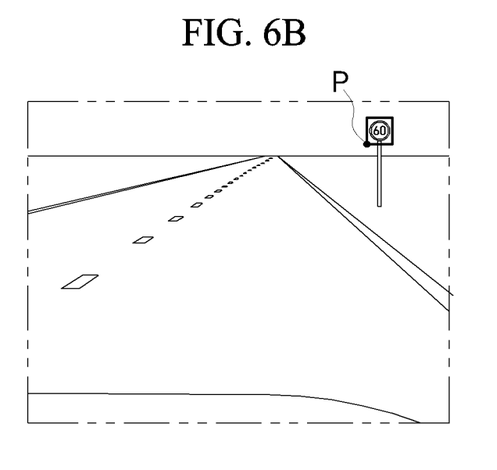

FIGS. 6A and 6B are diagrams illustrating an example in which the bounding box area and the reference point are set in the first and second images.

In an embodiment, a reference point P may be set to the nearest location within the bounding box area on the basis of the driving direction of the vehicle. In the case of a sign, a left bottom point P of a bounding box area thereof may be used as the reference point for distance estimation.

Then, the system estimates a location change of the camera for a predetermined time period in step S130.

Figure 7:
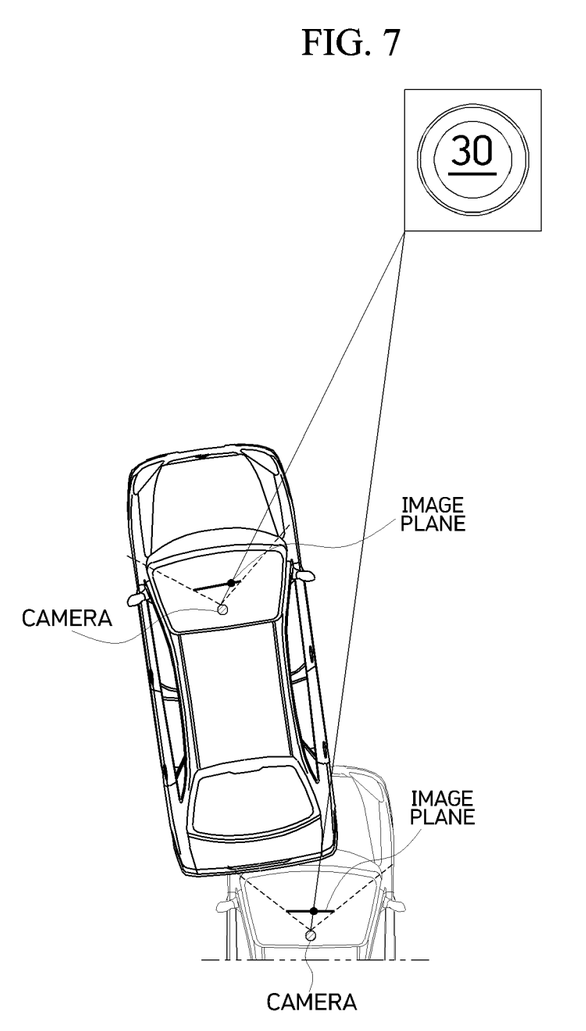
FIG. 7 is a diagram illustrating the situation in which the first and second images are acquired as the location of a vehicle is changed.
Figure 8:
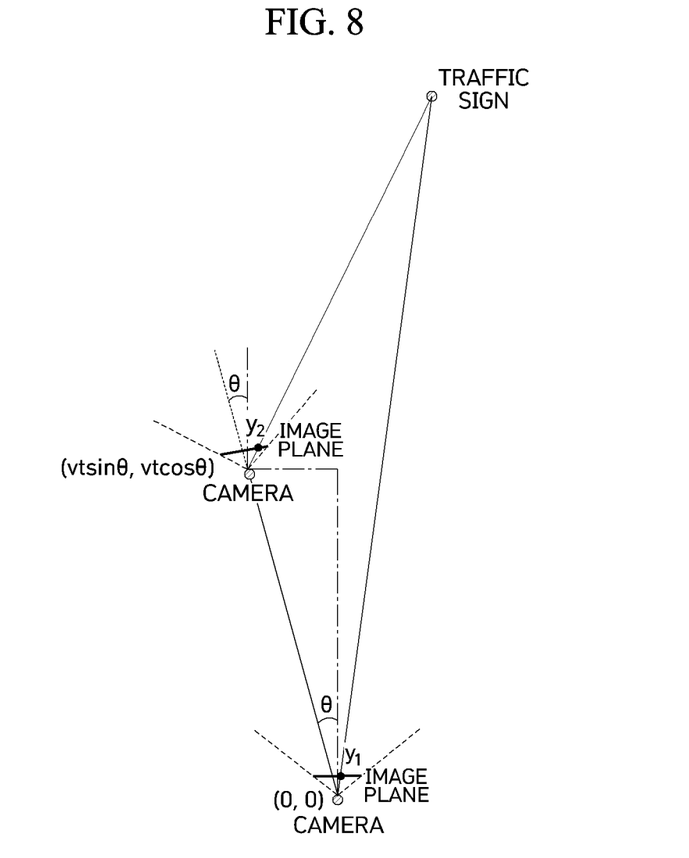
FIG. 8 is a diagram for describing a process of estimating the distance from an object on the basis of the first and second images.

FIG. 7 is a diagram illustrating the situation in which the first and second images are acquired as the location of the vehicle is changed. FIG. 8 is a diagram for describing a process of estimating the distance to an object on the basis of the first and second images.

In the present disclosure, the two images, acquired when the location of the vehicle is slightly changed as illustrated in FIG. 7, are used to estimate the distance to the object. Since the location of the vehicle is slightly changed when the first and second images are acquired, the change in ground height of the camera and the rotation of the camera in pitch and roll directions have a small influence.

When the first location of the camera is set to the origin and the driving direction of the vehicle is set to the y-axis in order to estimate the location change of the camera, the location change may be simulated as a 2D problem as illustrated in FIG. 8.

Then, the system acquires a first pixel coordinate value for a pixel corresponding to the location of the object on the image plane of the first image, and calculates a first straight line equation passing through the first pixel coordinate value on the basis of the origin. The first pixel coordinate value and the first straight line equation may be expressed as Equation 1 and Equation 2 below, respectively.

$$p_1 = (y_1, f) \qquad \text{[Equation 1]}$$

$$y = \frac{f}{y_1}x \qquad \text{[Equation 2]}$$

In Equations 1 and 2, $y_1$ represents the physical horizontal location of a pixel corresponding to the location (reference point) of the object within the image plane of the first image, and f represents the focus information of the camera.

Then, the system estimates the coordinate value (v sin θ, v cos θ) of the second location on the basis of a predetermined time period t taken for the camera to move from the first location to the second location, a vehicle velocity v, and vehicle steering angle information θ at the first location.

Based on the coordinate value, the system acquires a second pixel coordinate value for the pixel corresponding to the location of the object within the image plane of the second image.

When a physical horizontal location corresponding to the location of the object within the image plane of the second image is $y_2$ in the case that the vehicle rotates in the yaw direction, the second pixel coordinate value may be expressed as Equation 3 below.

$$p_2 = \begin{bmatrix} \cos\phi & -\sin\phi \\ \sin\phi & \cos\phi \end{bmatrix} \begin{bmatrix} y_2 - vt\sin\theta \\ vt\cos\theta + f \end{bmatrix} \quad \text{[Equation 3]}$$

After calculating the second pixel coordinate value, the system calculates a second straight line equation which passes through the coordinate value of the second location and the second pixel coordinate value and is expressed as Equation 4 below, on the basis of the coordinate value of the second location and vehicle steering angle information φ at the second location.

$$y = \frac{\sin\phi(y_2 - vt\sin\theta) + \cos\phi(vt\cos\theta + f) - vt\cos\theta}{\cos\phi(y_2 - vt\sin\theta) - \sin\phi(vt\cos\theta + f) - vt\sin\theta} \quad \text{[Equation 4]}$$

Then, the system may calculate the location of the object through the coordinate of an intersection between the first and second straight line equations, and the intersection coordinate may be expressed as Equation 5 below. After calculating the intersection coordinate of the object, the system may calculate the distance to the object from the second location as the current location on the basis of the intersection coordinate of the object.

$$x = \frac{vt\cos\theta - \alpha vt\sin\theta}{\frac{f}{y_1} - \alpha}, \quad y = \frac{f}{y_1} \frac{vt\cos\theta - \alpha vt\sin\theta}{\frac{f}{y_1} - \alpha}, \quad \text{[Equation 5]}$$

In Equation 5, α represents the term.

In the above-described embodiment of the present disclosure, the distance to the object is estimated on the basis of a single image through the front camera on the 2D plane. In an embodiment of the present disclosure, a rotation angle in the yaw direction may be further considered, and calibrated and applied to the calculated distance to the object.

In other words, the angle is not significantly changed in an image captured by the camera when the vehicle travels on an even road. However, when the vehicle travels on an uneven road, the angle is significantly changed in an image captured by the camera, even though the height of the camera is slightly changed. Therefore, when the distance to the object is estimated on the basis of the image captured on the uneven road, a wrong result is highly likely to be estimated.

Thus, in the embodiment of the present disclosure, the rotation angle information in the yaw direction may be estimated and reflected to calculate a more accurate distance to the object.

Figure 9:
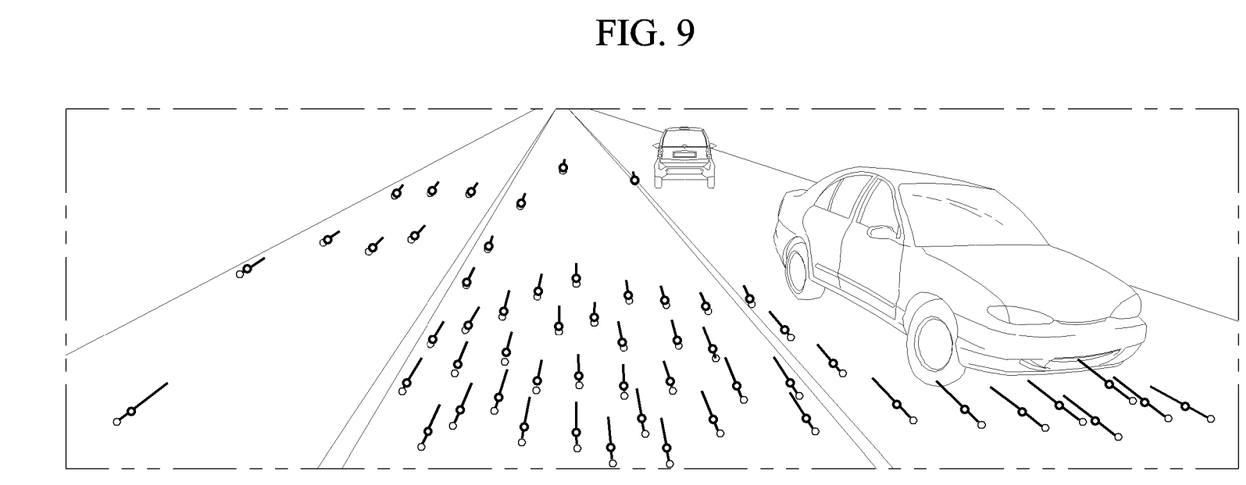
FIG. 9 is a diagram illustrating an optical flow on a ground area.
Figure 10:
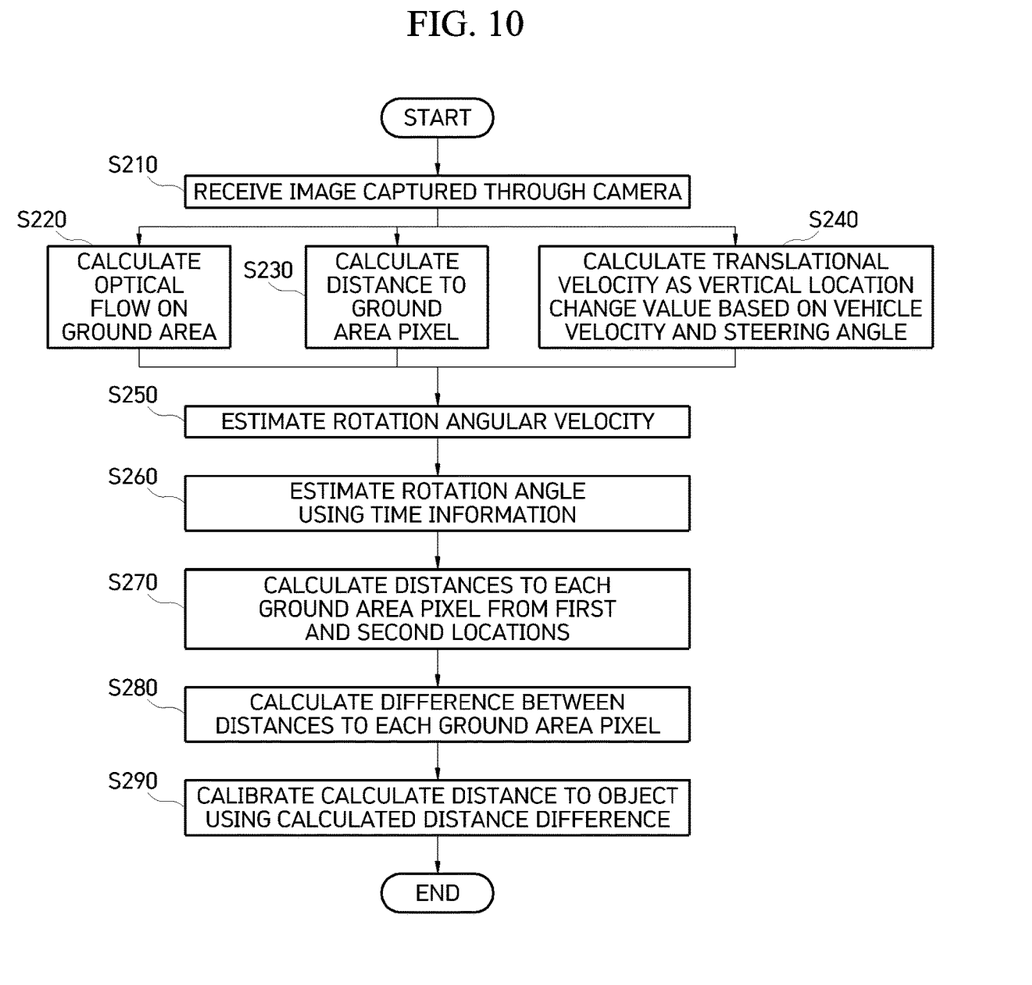
FIG. 10 is a flowchart for describing a rotation angle estimation method in accordance with an embodiment of the present disclosure.
Figure 11:
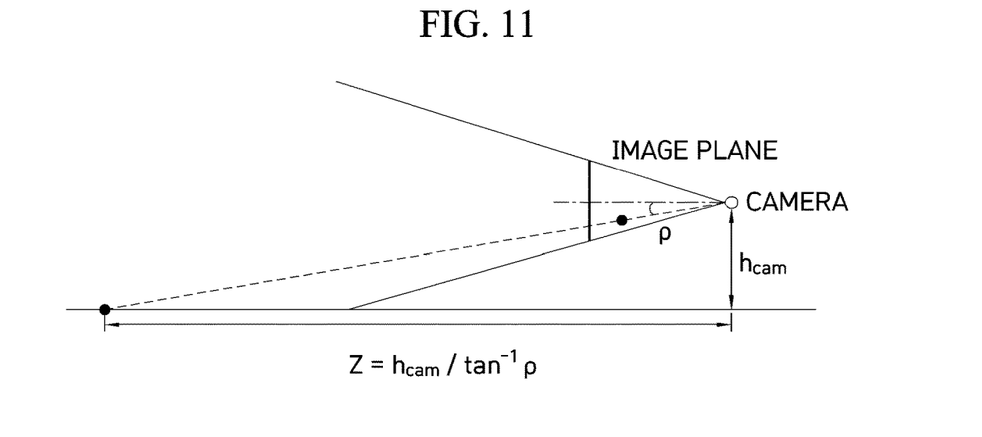
FIG. 11 is a flowchart for describing a process of calculating the distance to a ground area pixel.

FIG. 9 is a diagram illustrating an optical flow on a ground area. FIG. 10 is a flowchart for describing a rotation angle estimation method in accordance with an embodiment of the present disclosure. FIG. 11 is a diagram for describing a process of calculating the distance to a ground area pixel.

When receiving an image through the camera in step S210, the system calculates an optical flow for consecutive frames of the image in step S220, calculates the distance to a ground area pixel from the camera for each frame in step S230, and calculates a translational velocity as a vertical location change value on the basis of a vehicle velocity and a steering angle in step S240.

The optical flow shows the movement of brightness patterns as illustrated in FIG. 9, when the brightness value of each pixel is not changed in consecutive images.

General optical flow vectors $v_x$ and $v_y$ may be expressed as Equation 6 below.

$$\begin{bmatrix} v_x \\ v_y \end{bmatrix} = -\begin{bmatrix} \frac{f}{Z} & 0 & \frac{-x}{Z} & \frac{-xy}{f} & \frac{f^2+y^2}{f} & -y \\ 0 & \frac{f}{Z} & \frac{-y}{Z} & -(f^2+y^2) & \frac{xy}{f} & x \end{bmatrix} \begin{bmatrix} t_x \\ t_y \\ t_z \\ w_x \\ w_y \\ w_z \end{bmatrix} \quad \text{[Equation 6]}$$

In Equation 6, f represents the focal distance of the camera, x and y represent the locations of the ground area pixel in the consecutive frames of the image, ($t_x$, $t_y$, $t_z$) represents the translational velocity, and ($w_x$, $w_y$, $w_z$) represents a rotation angular velocity, and Z represents the distance to the ground area pixel from the camera.

Since the height of the ground surface is 0 in Equation 6, the distance to the ground area pixel from the camera in a single image may be calculated as illustrated in FIG. 11, and the translational velocity may be calculated from the vehicle velocity and the steering angle. Finally, the system may calculate the rotation angular velocity through simultaneous equations for optical flow vectors of three or more image points in step S250.

After calculating the rotation angular velocity, the system may estimate a rotation angle through an integration operation, by using predetermined time information at the first and second locations, in step S260.

Then, the system calculates distances Z to the ground area pixel from the first and second locations on the basis of the rotation angle ρ and the height information $h_{cam}$ of the camera, in step S270.

Then, the system calculates a difference between the distances to the ground area pixel from the first and second locations in step S280, and then calibrates the distance to the object, calculated on the basis of the location change of the camera, by using the calculated distance difference in step S290.

As such, the object distance measurement system in accordance with the embodiment of the present disclosure may estimate a change in location of the camera by estimating a vertical rotation angle using the optical flow information, and calibrate the distance information from an object on the basis of the location change, thereby calculating more accurate distance information.

Steps S110 to S290 in the above descriptions may be further divided into additional steps or combined into less steps, depending on embodiments of the present disclosure. Furthermore, some steps may be omitted if necessary, and the order of the steps may be changed. Furthermore, the content of FIG. 4 may be applied to the contents of FIGS. 5 to 11, even though the content of FIG. 4 is omitted.

Hereafter, an object distance measurement method based on a camera, which is performed by the object distance measurement system, in accordance with another embodiment of the present disclosure will be described with reference to FIGS. 12 to 17. In particular, the object distance measurement method in accordance with the present embodiment may include sensing the nearest traffic light on the basis of the distance to an object, which is calculated through the above-described embodiment, and controlling the vehicle.

Figure 12:
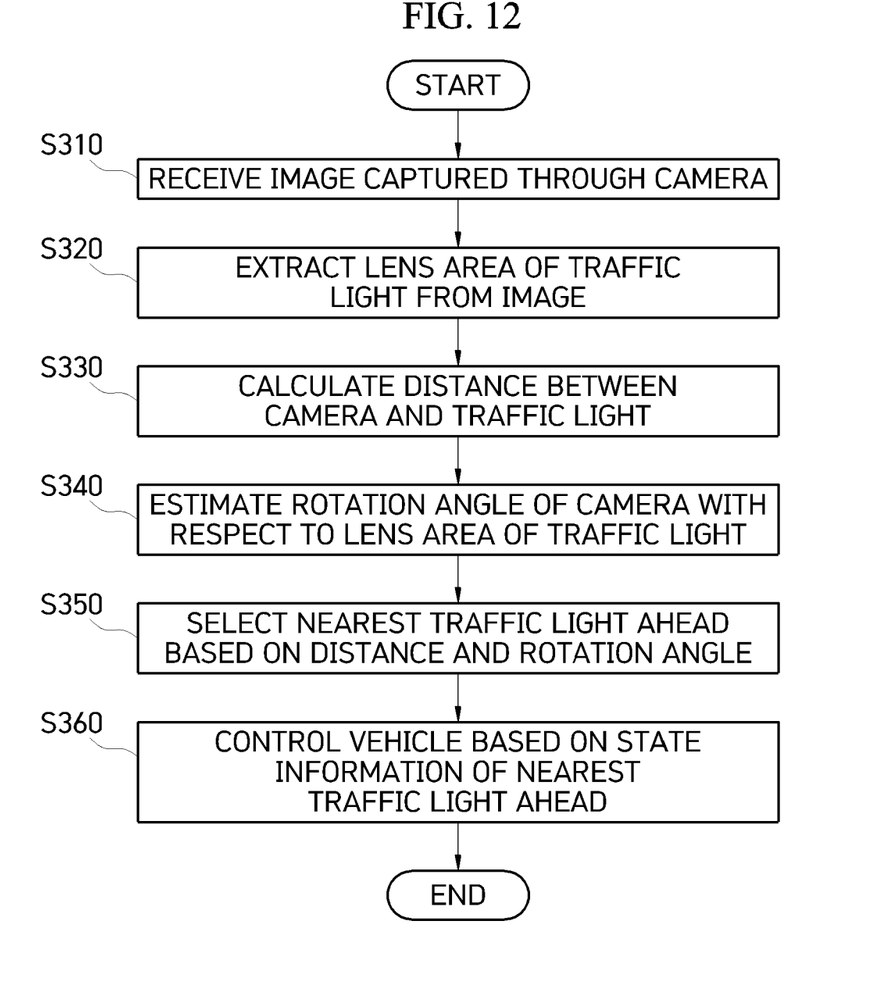
FIG. 12 is a flowchart illustrating a vehicle control method in accordance with an embodiment of the present disclosure.

FIG. 12 is a flowchart illustrating a vehicle control method in accordance with an embodiment of the present disclosure.

It may be understood that steps illustrated in FIG. 12 are performed by the object distance measurement system 100 based on a camera, but the present disclosure is not necessarily limited thereto. In the present disclosure, a vehicle may include not only an autonomous vehicle, but also a vehicle in which an autonomous controller can be installed and operated.

First, the system receives an image captured through a camera of the vehicle in step S310. At this time, the camera of the vehicle may be a front camera for driving assistance of the vehicle, but the present disclosure is not necessarily limited thereto.

In an embodiment, the system may recognize the state information of a traffic light from the image captured through the camera of the vehicle at the same time as the captured image is received, and provide the state information together with the captured image. The state information of the traffic light indicates instruction information based on the color of the traffic light.

Then, the system extracts a lens area of the traffic light from the image captured by the camera in step S320.

Figure 13:
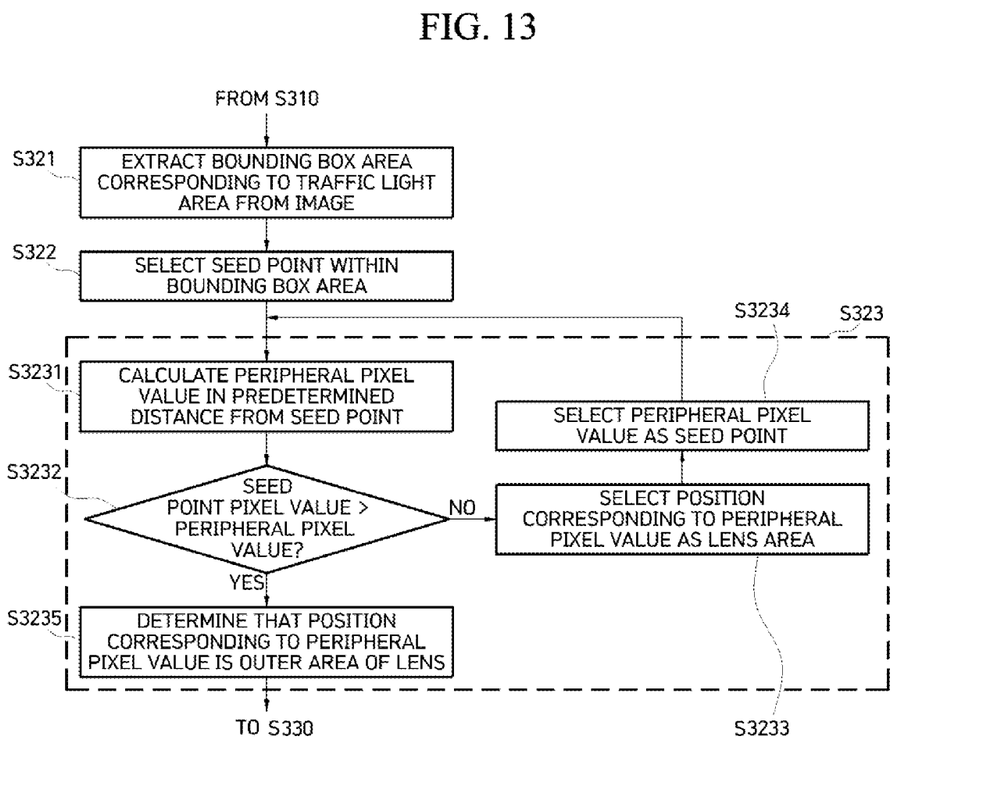
FIG. 13 is a flowchart for describing a process of extracting a lens area of a traffic light.

FIG. 13 is a flowchart for describing the process of extracting the lens area of the traffic light.

The traffic light includes a lens configured to output light and a housing configured to cover the lens, and the object distance measurement method in accordance with the embodiment of the present disclosure requires a process of extracting the lens area.

For this process, the system extracts a bounding box area corresponding to a traffic light area from the image in step S321.

Then, the system selects a seed point within the bounding box area in step S322. In an embodiment, the brightest point around the center point of the bounding box area, i.e., the brightest point within a predetermined range from the center point may be selected as the seed point. Since the lens is a part from which light is outputted, the lens area is brighter than the dark housing. In some cases, the sky may be brighter than the lens, due to sunlight. Thus, a point around the center point is selected as the seed point.

Then, the system extracts the lens area of the traffic light on the basis of the difference between the pixel value of the selected seed point and a peripheral pixel value, in step S323.

More specifically, the system calculates a pixel value (hereafter, a peripheral pixel value) at a position moved in a predetermined direction from the selected seed point, in step S3231. For example, the peripheral pixel value is calculated while the position is moved in 8 directions from the seed point as the current location.

Then, the system calculates the difference between the pixel value of the seed point and the peripheral pixel value, and determines whether the calculated difference exceeds a predetermined threshold value, in step S3232.

When the determination result indicates that the difference between the pixel values is equal to or less than the threshold value, the system may select a position corresponding to the peripheral pixel value as the lens area in step S3233, and reset the peripheral pixel value in the corresponding direction to the seed point in step S3234. While moving the position in the predetermined direction on the basis of the corresponding seed point, the system repeats the above-described process. In some embodiments, a plurality of seed points may be set, and a plurality of positions corresponding to peripheral pixel values, which are selected as lens areas while the positions are moved in a plurality of directions from the initial seed point at the same time, may be used as the respective seed points. Therefore, as the above-described process is repeated, the lens area may be more rapidly decided.

On the other hand, when the determination result indicates that the difference between the pixel values exceeds the threshold value, the system determines that the position corresponding to the peripheral pixel value is an outer area of the lens, in step S3235.

Since the brightness of the lens area is significantly different from the brightness of the housing, the lens area may be accurately extracted through the above-described process.

Then, the system calculates the distance between the camera and the lens area of the traffic light in step S330.

Figure 14:
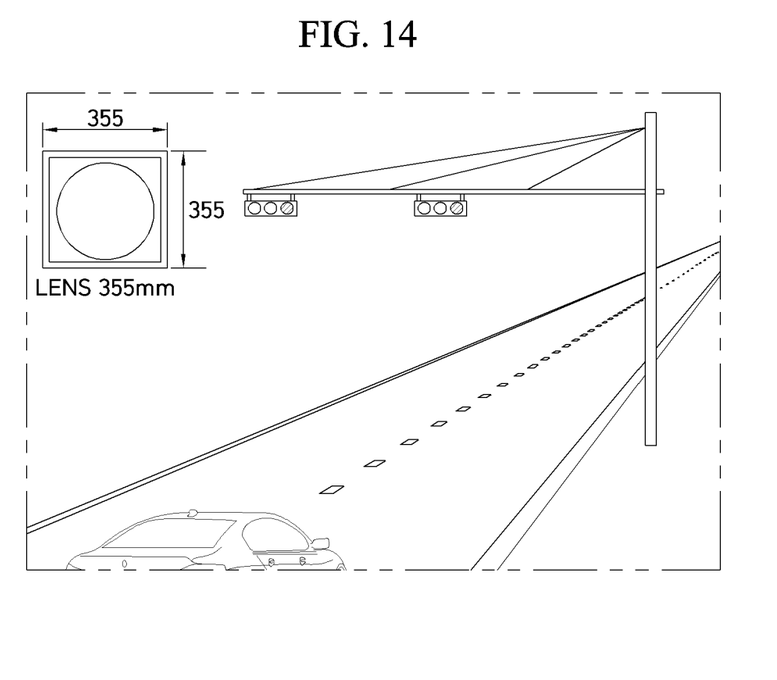
FIG. 14 is a diagram illustrating the size of a lens within a traffic light.
Figure 15:
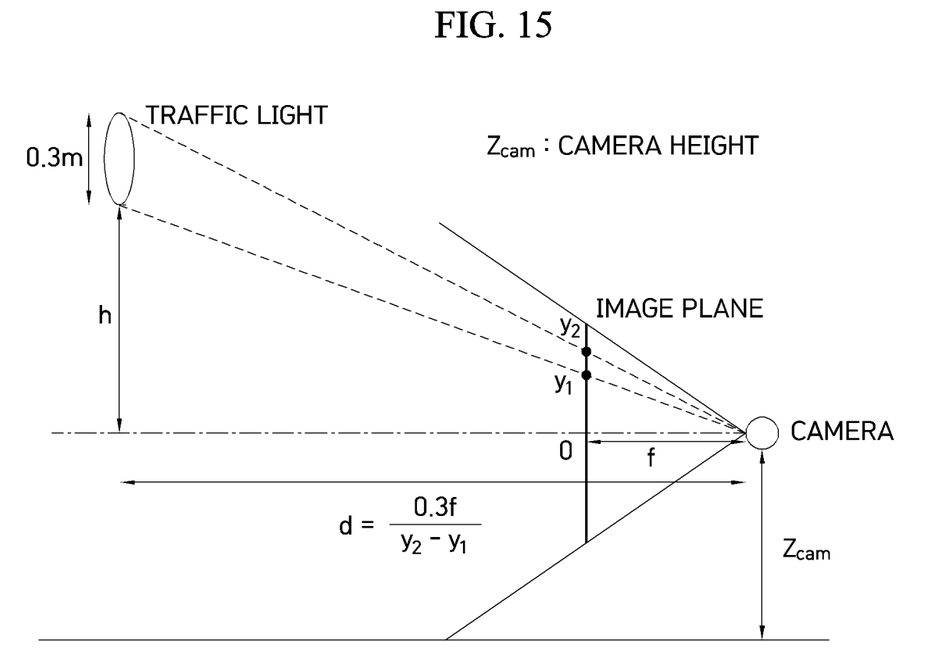
FIG. 15 is a diagram for describing a process of calculating the distance between a camera and a lens area.

FIG. 14 is a diagram illustrating the size of a lens within a traffic light. FIG. 15 is a diagram for describing a process of calculating the distance between a camera and a lens area.

Since a general traffic light only needs to be installed at a height of 450 cm or more, the general traffic light does not have a fixed height. However, since the size of a lens is decided as illustrated in FIG. 14, the distance between the camera and the lens area may be calculated through the size of the lens.

FIG. 15 is a vertical cross-sectional view illustrating that the traffic light is in front of the vehicle.

First, the system acquires the coordinate values of first and second pixel locations corresponding to the start point and the end point of the major axis for a lens area within the image plane of an image captured through a camera. When intrinsic parameters (f and pixel size) of the camera are calculated through a calibration process in FIG. 15, the system may acquire coordinate values $y_1$ and $y_2$ corresponding to the start and end points at which the traffic light lens appears in a direction perpendicular to the image plane.

Then, the system acquires height information h from the camera to the lens of the traffic light. At this time, since the camera is mounted on the vehicle, the mounting height $Z_{cam}$ of the camera may be considered together.

Then, the system calculates a distance d between the camera and the lens area on the basis of the distance f between the camera and the image plane based on the intrinsic parameters of the camera, the predetermined lens size information (0.3 m), the height information h, and the coordinate values $y_1$ and $y_2$ of the first and second pixel locations.

The process of calculating the distance d between the camera and the lens area may be expressed as the following equations.

When the coordinate values $y_1$ and $y_2$ corresponding to the start and end points at which the traffic light lens appears in the direction perpendicular to the image plane are acquired, the coordinate values $y_1$ and $y_2$ need to satisfy Equation 7 below according to the proportional relation.

$$f:y_1=d:h$$

$$f:y_2=d:h_{+0.3\,m} \qquad \text{[Equation 7]}$$

At this time, $y_1$ and $y_2$ represent values obtained by converting the pixel locations into physical values, f represents an intrinsic parameter of the camera, obtained through the calibration process, and d represents the distance to the traffic light lens.

The proportional relation equation may be summarized and expressed as Equation 8 below.

$$fh=dy_1$$

$$fh+0.3f=dy_2 \qquad \text{[Equation 8]}$$

When Equation 8 is summarized again, the distance from the camera to the traffic light lens may be calculated as follows:

$$d = \frac{0.3f}{y_2 - y_1}.$$

After calculating the distance from the camera of the vehicle to the traffic light lens, the system may select the nearest traffic light ahead on the basis of the calculated distance in step S350. Then, the system may control the vehicle on the basis of the state information of the nearest traffic light ahead in step S360.

That is, when a plurality of traffic lights are included in the image, the system may select the nearest traffic light on the basis of the calculated distance information, decide the nearest traffic light as a traffic light which affects the driving state at the current location, and control the vehicle according to the state of the corresponding traffic light.

Furthermore, the system may decide the nearest traffic light ahead by using angle information between the vehicle and the traffic light as well as the distance information in step S340. That is, the system may not only use the distance information of the plurality of traffic lights which are consecutively located in the forward direction, but also consider a traffic light included in a side portion of the image in a situation such as an intersection or five-way intersection, in order to decide the nearest traffic light head. The traffic light included in the side portion of the image does not matter when the vehicle travels straight. However, when the vehicle travels along a curved road, the nearest traffic light ahead may be more effectively decided.

Figure 16:
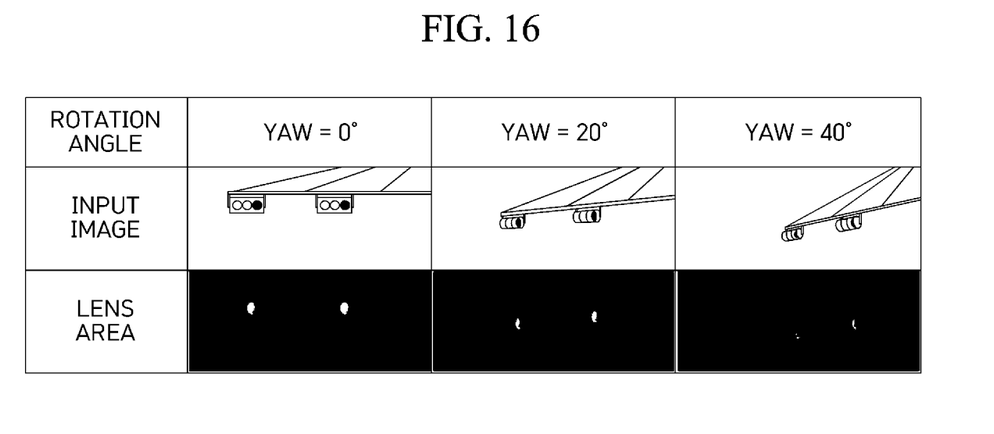
FIG. 16 is a diagram showing an example of the lens area which is changed for each rotation angle.
Figure 17:
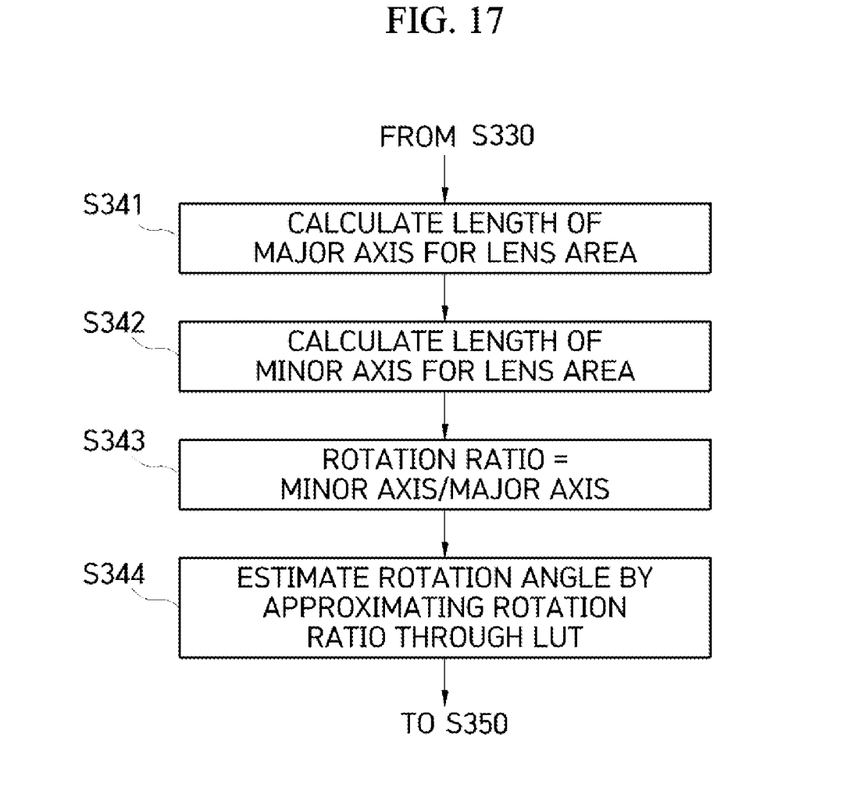
FIG. 17 is a flowchart for describing a process of estimating a rotation angle for a lens area.

FIG. 16 is a diagram showing an example of the lens area which is changed for each rotation angle. FIG. 17 is a flowchart for describing a process of estimating a rotation angle for a lens area.

Since a general traffic light is horizontally installed, a rotation angle in a pitch direction is small. However, depending on the direction of the road or vehicle, a yaw value is changed as illustrated in FIG. 16. When the vehicle travels straight, the lens area may be clearly extracted. However, as the rotation angle increases, the lens area may be covered by the visor of the traffic light.

In order to solve such a problem, the system in accordance with the embodiment of the present disclosure calculates the length of the major axis for the lens area in step S341, and calculates the length of the minor axis for the lens area in step S342. For this operation, the system finds the coordinates of the left end, the right end, the upper end, and the lower end of the edge of the lens area, calculates the length of the major axis through the vertical length of the edge, and calculates the length of the minor axis through the horizontal length of the edge.

Then, the system calculates the rotation ratio from the calculated lengths of the major axis and the minor axis in step S343. In an embodiment, the rotation ratio may be calculated through an operation of dividing the length of the minor axis by the length of the major axis.

Then, the system estimates the rotation angle by approximating the calculated rotation ratio through an LUT (Look Up Table) composed of simulation values, in step S344.

As such, the system may decide the nearest traffic light ahead among N traffic lights on the basis of the calculated rotation angle and the distance information, and control the vehicle on the basis of the state information of the nearest traffic light ahead.

Through this process, the system in accordance with the embodiment of the present disclosure may distinguish a signal for controlling the volume of traffic at the current location even in a five-way intersection or crowded intersection where a plurality of traffic lights appear. Thus, the system may improve city driving assistance performance and stability by using proper signal information.

In the above description, steps S310 to S360 may be divided into additional steps or combined into less steps, depending on embodiments of the present disclosure. Furthermore, some steps may be omitted, if necessary, and the order of the steps may be changed. Furthermore, the contents of FIGS. 4 to 11 may be applied to the contents of FIGS. 12 to 17, even though the contents of FIGS. 4 to 11 are omitted.

The above-described object distance measurement method in accordance with the embodiment of the present disclosure may be implemented as a program (or application) and stored in a medium, so as to be executed through a computer as hardware which is coupled thereto.

The above-described program may include codes written by a computer language such as C, C++, JAVA, Ruby or machine language, which can be read by a processor (CPU) of the computer through a device interface of the computer, in order to execute the above-described method which is implemented as a program read by the computer. Such codes may include a functional code related to a function defining functions required for executing the above-described methods, and include an execution procedure-related control code required for the processor of the computer to execute the functions according to a predetermined procedure. Furthermore, such codes may further include additional information required for the processor of the computer to execute the functions or a memory reference-related code indicating the position (address) of an internal or external memory of the computer, where a medium needs to be referred to. Furthermore, when the processor of the computer needs to communicate with another remote computer or server in order to execute the functions, the codes may further include communication-related codes indicating how to communicate with another remote computer or server by using a communication module of the computer and which information or media to transmit during communication.

The stored medium does not indicate a medium such as a register, cache or memory, which stores data for a short moment, but indicates a medium which semi-permanently stores data and can be read by a device. Specifically, examples of the storage medium include a ROM, RAM, CD-ROM, magnetic tape, floppy disk, optical data storage device and the like, but the present disclosure is not limited thereto. That is, the program may be stored in various recording media on various servers which the computer can access or various recording media of a user's computer. Furthermore, the media may store codes which can be distributed in computer systems connected through a network, and read by computers in a distributed manner.

The descriptions of the present disclosure are only examples, and by those skilled in the art to which the present disclosure pertains will understand that the present disclosure can be easily modified into other specific forms without changing the technical spirit or essential features of the present disclosure. Therefore, it should be understood that the above-described embodiments are only illustrative in all aspects and are not limitative. For example, components described in a singular form may be distributed and embodied. Similarly, distributed components may be embodied in a coupled form.

While various embodiments have been described above, it will be understood to those skilled in the art that the embodiments described are by way of example only. Accordingly, the disclosure described herein should not be limited based on the described embodiments.

What is claimed is:

1. An object distance measurement method, comprising:
    receiving an image captured by a camera of a vehicle;
    extracting, from the captured image, a bounding box area of an object included in the captured image;
    estimating a location change of the camera for a predetermined time period; and
    calculating a distance to the object based on the estimated location change of the camera,
    wherein receiving the captured image comprises:
        receiving a first image captured by the camera at a first location; and
        receiving a second image captured by the camera at a second location after the predetermined time period has elapsed since the first image was captured,
    wherein the distance to the object is calculated based on the estimated location change of the camera from the first location to the second location, and
    wherein estimating the location change of the camera comprises:
        setting the first location of the camera as an original location and setting a driving direction of the vehicle as a point on a y-axis; and
        estimating a coordinate value of the second location based on (1) the predetermined time period, and (2) vehicle velocity and vehicle steering angle of the vehicle at the first location.

2. The object distance measurement method of claim 1, wherein calculating the distance to the object comprises:
    acquiring a first pixel coordinate value for a first pixel corresponding to a first location of the object on an image plane of the first image;
    calculating a first straight line equation passing through the first pixel coordinate value based on the original location;
    acquiring a second pixel coordinate value for a second pixel corresponding to a second location of the object on an image plane of the second image;
    calculating a second straight line equation passing through a coordinate value of the second location and the second pixel coordinate value based on (1) the coordinate value of the second location, (2) the second pixel coordinate value, and (3) vehicle steering angle of the vehicle at the second location; and
    calculating the distance to the object based on a coordinate of an intersection between the first and second straight line equations.

3. The object distance measurement method of claim 2, wherein the first and second pixel coordinate values are respectively calculated based on focus information of the camera and a physical horizontal location of a pixel corresponding to the first and second locations.

4. A system for calculating a distance to an object based on an image captured by a camera positioned at a front portion of a vehicle, the system comprising:
    a processor; and
    a memory in communication with the processor and storing instructions that, when executed by the processor, cause the processor to control the system to perform:
        receiving the image captured by the camera;
        extracting a bounding box area of the object included in the captured image;
        estimating a location change of the camera for a predetermined time period; and
        calculating a distance to the object based on the estimated location change of the camera,
    wherein, for receiving the image captured by the camera, the instructions, when executed by the processor, further cause the processor to control the system to perform:
        receiving a first image captured by the camera at a first location; and
        receiving a second image captured by the camera at a second location after the predetermined time period has elapsed since the first image was captured,
    wherein the distance to the object is calculated based on the estimated location change of the camera from the first location to the second location, and
    wherein, for estimating the location change of the camera, the instructions, when executed by the processor, further cause the processor to control the system to perform:
        setting the first location of the camera as an original location and setting a driving direction of the vehicle as a point on a y-axis; and
        estimating a coordinate value of the second location based on (1) the predetermined time period, and (2) vehicle velocity and vehicle steering angle of the vehicle at the first location.

* * * * *